United States Patent [19]

Sirat et al.

[11] Patent Number: 5,134,396
[45] Date of Patent: Jul. 28, 1992

[54] METHOD AND APPARATUS FOR ENCODING AND DECODING DATA UTILIZING DATA COMPRESSION AND NEURAL NETWORKS

[75] Inventors: Jacques A. Sirat, Limeil-Brevannes; Jean-Renaud Viala, Montrouge; Christian Remus, Joinville-le-Pont, all of France

[73] Assignee: U. S. Philips Corporation, New York, N.Y.

[21] Appl. No.: 514,818

[22] Filed: Apr. 26, 1990

[30] Foreign Application Priority Data

Apr. 26, 1989 [FR] France ............................... 89 05532

[51] Int. Cl.⁵ ............................................... H03M 7/00
[52] U.S. Cl. ........................................ 341/51; 341/50; 341/78
[58] Field of Search .................... 341/50, 51, 78, 88

[56] References Cited

U.S. PATENT DOCUMENTS

| | | | |
|---|---|---|---|
| 3,394,352 | 7/1968 | Wernikoff et al. | 341/51 |
| 4,646,061 | 2/1987 | Bledsoe | 341/65 |
| 4,730,348 | 3/1988 | MacCrisken | 375/122 |
| 4,929,946 | 5/1990 | O'Brien et al. | 341/87 |
| 4,972,187 | 11/1990 | Wecker | 341/95 |
| 4,972,473 | 11/1990 | Ejiri et al. | 380/20 |

Primary Examiner—A. D. Pellinen
Assistant Examiner—Marc S. Hoff
Attorney, Agent, or Firm—Michael E. Marion

[57] ABSTRACT

A method structure for the compression of data utilizes an encoder which effects a transform with the aid of a coding neural network, and a decoder which includes a matched decoding neural network with effects almost the inverse transform of the encoder. The method puts in competition M coding neural networks ($30_1$ to $30_M$) wherein M > 1 positioned at the transmission end which effects a same type of transform and the encoded data of one of which are transmitted, after selection (32, 33) at a given instant, towards a matched decoding neural network which forms part of a set of several matched neural networks ($60_1$ to $60_Q$) provided at the receiver end. Learning is effected on the basis of predetermined samples. The encoder may comprise, in addition to the coding neural network ($30_1$ to $30_M$), a matched decoding neural network ($35_1$ to $35_M$) so as to effect the selection (32, 33) of the best coding neural network in accordance with an error criterion.

19 Claims, 5 Drawing Sheets

METHOD AND APPARATUS FOR ENCODING AND DECODING DATA UTILIZING DATA COMPRESSION AND NEURAL NETWORKS

BACKGROUND OF THE INVENTION

1. Field of the Invention

The invention relates to a data compression method which is put into effect with the aid of:

an encoder which effects a transform with the aid of a coding neural network provided at the transmission end, having a number of input neurons greater than or equal to the number of output neurons, and a decoder which comprises a decoding neural network which is matched to the coding neural network positioned at the receiving end and effects almost the inverse transform of the encoder with a number of input neurons less than or equal to the number of output neurons, the method comprising the following steps:

learning by the coding and decoding neural networks by adapting their synaptic coefficients to the example of the blocks of input data, encoding data blocks to be processed, the transmission of the encoded data via a channel, decoding of the encoded data received by the matched decoding neural network and formation of the recovered data blocks.

It also relates to an encoder and a decoder which put such a method into effect. The method can be employed in a structure in which an encoder, a decoder and a transmission signal are combined.

2. Description of the Related Art

A structure of this kind is described in the document: "Image compression by back propagation: an example of extensional programming" by G. W. COTTRELL, P. MUNRO and D. ZIPSET in "Advances in Cognitive Science Vol. 3, 1987, Norwood N.J, Editor: N. E. SHARKEY.

This document describes an image compression technique which puts two associated neural networks into operation, one serving for the encoding which transforms the input data into encoded data and the other serving for the decoding which effects an inverse mechanism. It is necessary to teach examples to the coding and decoding neural networks and for that purpose to modify their synaptic coefficients so as to ensure that the encoded data are in conformity with the data anticipated for the predetermined types of examples. This teaching can be effected in accordance with the known gradient back propagation technique or the known technique of analysis of principal components. The encoded data are transmitted via a channel, to a decoder which includes a decoding neural network which performs the inverse mechanism. To that end, synaptic coefficients which are determined after the learning step has ended, are loaded in the decoding neural network. The structure can then operate with data originating from an image to be processed.

Such a structure is composed of three layers when the coding and decoding neural networks are combined:

a N-neuron input layer which receives an input data block at each instant, a P-neuron hidden layer wherein $P<N$ whose outputs which are quantised over Q bits represent the compressed information, a N-neuron output layer to recover an output data block.

But such a structure must be adapted for a given type of texture and thereafter will process all the blocks of the same image and all the consecutive images with the same synaptic coefficients. Thus, images having image structures or zone structures which are very different as regards their uniformity or their non-uniformity, will be processed in the same manner. Consequently, a coding could be optimum for one type of texture and be poorly adapted to an other type of texture.

SUMMARY OF THE INVENTION

The problem posed is consequently to take account of the non-homogeneous spatial and temporal nature of the image data so as to increase the compression rate without increasing the processing load imposed on a neural network.

This problem is solved by means of a method which puts in competition M coding neural networks, wherein $M>1$, provided at the transmission end which effect the same type of transform and the encoded data of one of which are transmitted, after selection, at a given instant, towards a matched decoding neural network which forms part of a set of several matched decoding networks positioned at the receiver end, learning being effected, separately, or simultaneously, by each coding and decoding neural network so that they learn a specific class of predetermined examples of data blocks and are matched with the aid of a predetermined adaptation criterion, a selection circuit selecting on the basis of a selection criterion, the coding neural networks which effect the best coding of the data to be processed and, via this coding network, transmit over the channel the P data encoded by this coding neural network and its index to render the matched decoding neural network active.

A block of N data will thus be coded over P output data wherein $P \leq N$. The P data of a block can be supplied by one single neural network. They can alternatively be supplied one after the other by T neural networks. The P output data $y_k$ can be quantised over $Q_k$ bits, respectively, wherein k is the index of the neuron of the hidden layer).

In accordance with a first embodiment, the selection criterion is applied a priori. In this case the selection criterion compares at least one characteristic of each data block to be processed to a predetermined corresponding characteristic selected by the coding neural network and the matched decoding neural network which is related to the most approximate characteristic.

The characteristics taken into consideration can be formed by the minimum value and the maximum value of the data.

But it is possible to use a selection criterion a posteriori. Thus, in accordance with a second embodiment, the selection circuit determines the sum of all the energies $$\left( \sum_k (y_k)^2 \right)$$

of the output neurons of the coding neural networks and selects that neuron for which this energy is at its maximum.

It is equally possible to utilise a different selection criterion a posteriori. Thus, in accordance with a second embodiment, the encoder comprises several pairs of neural networks, one pair being constituted by a coding neural network and a matched decoding neural network, the selection circuit then comparing during the coding step and for each pair, the input data of the coding neural network to the output data of its decoding neural network, the selection criterion of the best encoding consisting in selecting that coding neural network for which this deviation is minimal. The deviation can be measured by the means square error function or any other function. It can, for example, give preference to the low spatial frequencies in order to adapt itself to the sensitivity of the eye.

As a function of the type of application (transmission and recording of images or sound at rates varying between some kHz for a low-resolution sound to some hundreds of MHz for high-definition television images, the constraints in sampling frequency, precision, adaptativily, cost . . . will not be the same. It is therefore necessary for the neural network to be adapted to these tasks of different natures. For that purpose, in the cause of the learning stage, the method puts a predetermined adaptation technique into effect. This technique may be the gradient back propagation algorithm which is known, for example, from the document "PARALLEL DISTRIBUTED PROCESSING", D. E. RUMENLHART, G. E. HINTON, R. J. WILLIAMS, Learning Internal Representations by error propagation, chap. 8, page 318 MIT Press. Editor: J. A. FELDMAN, P. J. HAYES, D. E. RUMELHART.

This criterion may be the algorithm of analysis in principal components of the covariance matrix which is described in, for example, the document: "Auto-Association by Multilayer Perceptrons and Singular Value Decomposition" H. Bourlard and Y. Kamp Biological Cybernetics, vol. 59, 1988, pages 291-294.

To effect the learning procedure, the image can be divided into sub-images which supply the examples of data blocks to be processed. These samples can also be included in a texture catalogue.

When the learning is effected a priori on a set of representative sequences, the number M of the networks to be put into competition must be sufficiently large in order to cover almost the totality of possible sequence distributions.

The most natural mode of operation is to dispose the M operational neural networks simultaneously at the coding and the decoding ends.

A further possibility by means of which it is possible to reduce the bulk of the coder and the decoder consists in dividing the set of m networks into a plurality of sub-sets of M networks, wherein M is much lower than M and to regularly select (for example at each image), at the coding level, one of these sub-sets as a function of a given criterion (for example the minimization of the means square error on the current image or the preceding image). At the decoding level the number of networks is then limited to m and, previous to the reception of the encoded sequences, the characteristics of these m coding sub-networks are loaded there. This loading operation can be effected on the basis of information transmitted by the encoder or preferably information stored at the level of the decoder. This provides a reduction in the number of processing numbers in a ratio m/M.

It will be clear that it is possible for the P output data to originate from a single channel of the M processing channels (coding and decoding). It is alternatively possible to distribute the load of the processing over the totality of the M neural networks of the encoder and the decoder.

At the coding level, by designated the input data of the networks by $X=\{x_l\}$ wherein $l=1 \ldots N$, and by $Y_i=\{Y_{k,i}\}$ wherein $k=1 \ldots P$, the outputs of a coding network $RC_i$ wherein $i=1 \ldots M$, the transform effected by the coder is written:

$$Y_{k,i}=F_{i,k}(X)$$

wherein $F_{i,k}$ is the response of the network i.

As only a coding network of the encoder and a decoding network of the decoder are simultaneously operative, they must calculate the P output values in an elementary calculation cycle.

It is then possible to distribute this calculation over the set of networks by defining the networks $CR_k$ having M outputs whose response will be characterized by $F_{i,k}$. The vector $Z(k)=\{Z_i(k)\}$ wherein $1 \leq i \leq M$ will then be obtained at the output of the $CR_k$, so that:

$$Z_i(k)=F_{i,k}(X)=Y_{k,i}$$

Each of these P new circuits will only have to calculate during an elementary period of time, the output $Z_j(k)$ which corresponds to the output k of the network having the index j.

BRIEF DESCRIPTION OF THE DRAWING

The invention and how it can be put into effect will be better understood from the following description with reference to the following Figures which are given by way of non-limitative example and wherein.

DETAILED DESCRIPTION OF THE PREFERRED EMBODIMENT

Figure 1A:
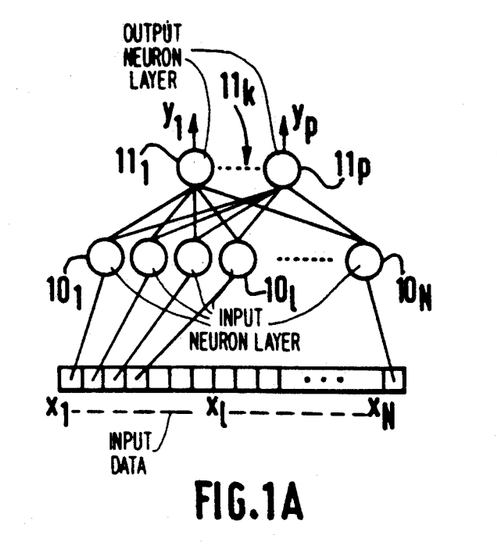
FIGS. 1A, 1B: are schematic representations of a coding and decoding neural network.

FIG. 1A shows a basic circuit diagram of the processing operation effected by a coding neural network. The input data $x_1 \ldots x_L \ldots x_N$ are applied to the network and arrive at the input neurons $10_1$ to $10_N$ of an input layer. These neurons are connected to the output neurons $11_1 \ldots 11_k \ldots 11_P$ of an output layer. A synaptic coefficient $C_{kl}$ (l: input, k: output) is associated with each link. The number of input neurons is greater than or equal to the number of output neurons P so as to effect a data compression. The data intended to be transmitted via a channel are these coded data. This channel may be constituted by a wired link or by a transmission medium.

Figure 1B:
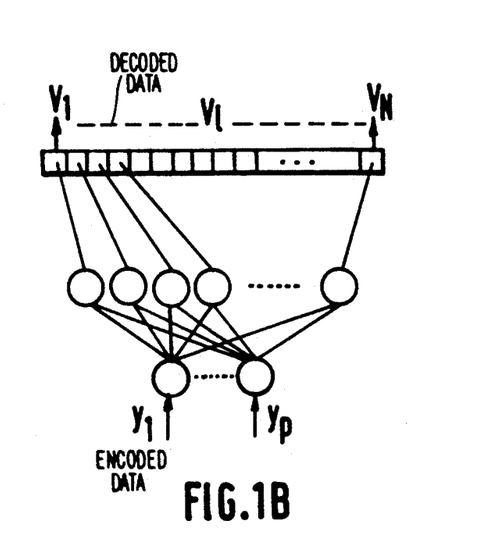

FIG. 1B shows the basic circuit diagram of the processing operation effected by the decoding neural network in layers which are interconnected as for the coding neural network. It receives the encoded data $y_1 \ldots y_p$ and at its output supplies the decoded data $V_1 \ldots V_N$.

Figure 2:
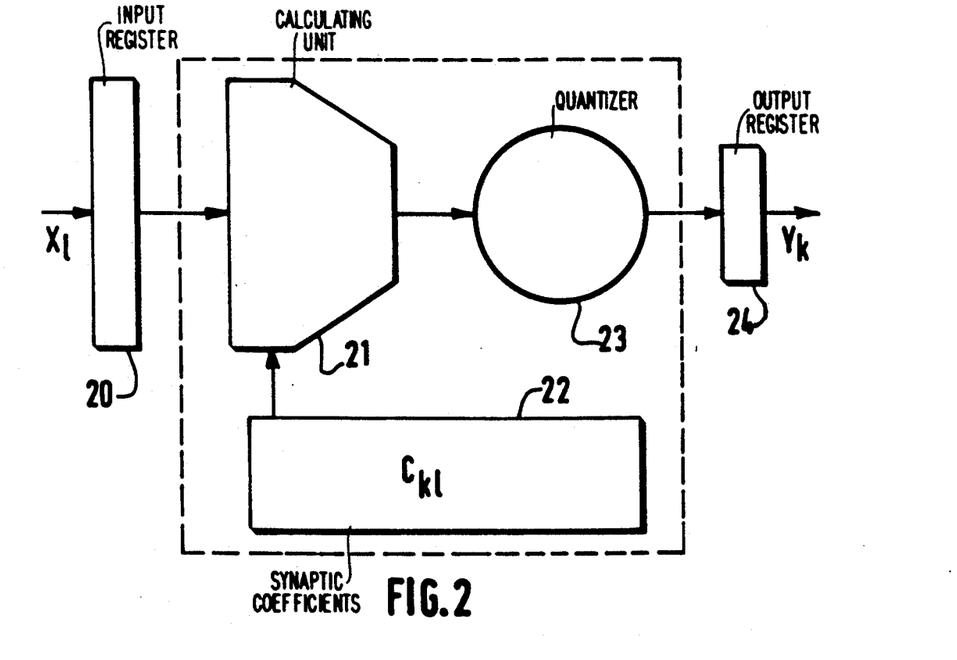
FIG. 2: is a circuit diagram of a processing unit of the neural network.

FIG. 2 illustrates a processing arrangement of a neural network. An input register 20 applies the input data $X_l$ to a calculating unit 21 which performs the calculation:

$$\sum_k C_{kl} X_l.$$

The synaptic coefficients $C_{kl}$ are entered into a memory 22. The output of the calculating unit is connected to a quantizer 23 which applies a non-linear function F. The encoded data $y_k$ appear at an output register 24.

Before the coding and decoding phases are effected, the learning phase must be performed which allows the adaptation of the synaptic coefficients of the neural network to the compression task. To that end, predetermined examples for which the desired result is previously known are applied to the input. It is sufficient to compare the results obtained with the desired results and in accordance with an adaptive mechanism the synaptic coefficients $C_{kl}$ are adapted to the task assigned to them. This adaptation will not be developed here. It is effected in a manner known for a neural network. Different algorithms are possible, the algorithms used most being the gradient back propagation algorithm and the principal value analysis algorithm of the covariance matrix. References for putting these algorithms into effect have already been cited in the foregoing.

Figure 3:
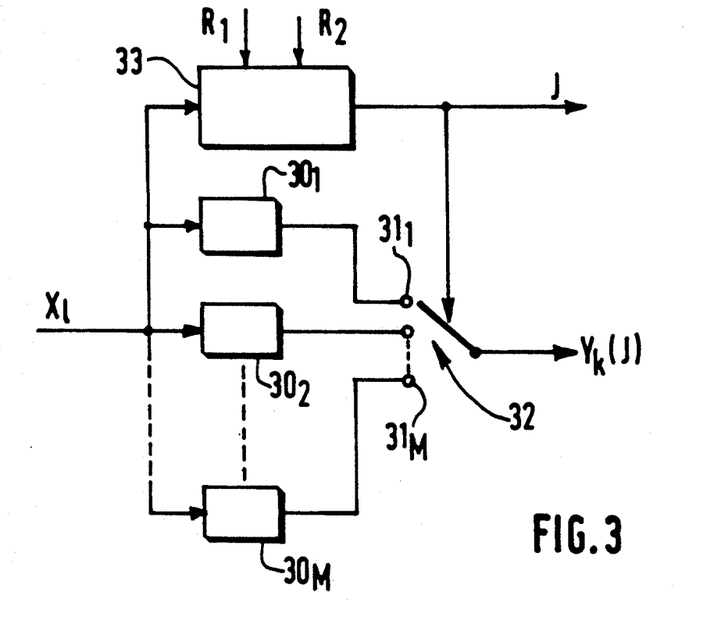
FIG. 3: is a circuit diagram of an encoder according to the invention provided with an priori selection circuit.

FIG. 3 shows the circuit diagram of an encoder according to the invention. It comprises M coding neural networks $30_1, 30_2 \ldots 30_M$ which all receive the input data $X_1$. Each neural network acts for a class of predetermined examples to which it has been adapted during the learning phase. The results obtained ($y_k$, k=1,P) by each neural network are supplied from outputs which are symbolised in the Figure by the terminals $31_1 \ldots 31_M$.

To effect the selection at the output by the selector 32, a selection circuit 33 is used which receives the data $X_1$ to be encoded. This selection circuit has a group of references $R_1, R_2, \ldots$ and compares the data $X_1$ to these references. A reference is linked to a characteristic of the data block. For example, the characteristics taken into account are constituted by the minimum value and the maximum value of the data of the example and of the data block to be processed.

A given reference group is associated with each example of a data block. When the characteristic of the data block is, for example greater than or less than a reference or is comprised between two references, the selection circuit 33 supplies an index J which relates to the group of the neural networks which is in the best position. The selector 32 selects the neural network having this index. The data $y_k(J)$ are transmitted as the index J via a transmission channel. This embodiment is denoted an a priori embodiment.

Figure 5A:
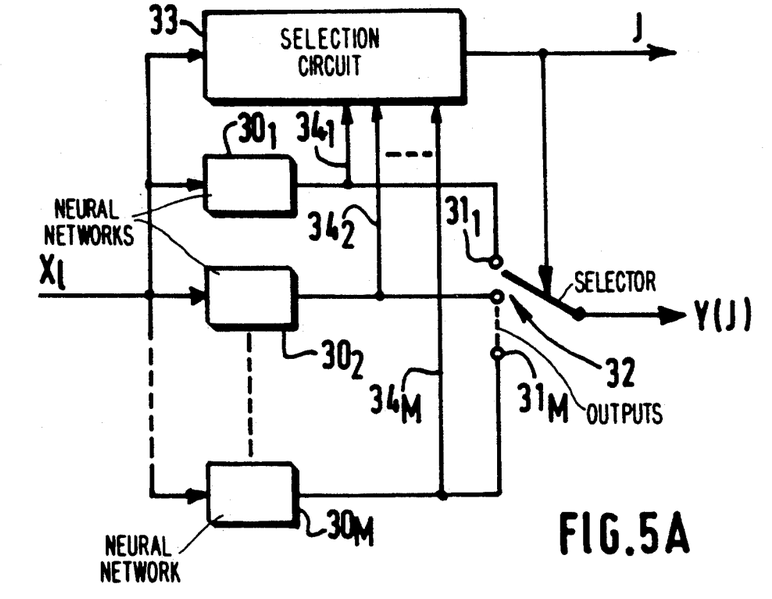

In accordance with a second embodiment of the encoder shown in FIG. 5A, the selection circuit has no reference groups. Its mode of operation is an a posteriori mode. In this case it receives the outputs $y_k$ $34_1 \ldots 34_M$ of all the neural networks and determines a characteristic, for example the energy of the data, and selects the neural network which maximises this energy. As in the foregoing, the selector 32 selects in accordance with the invex J.

Figure 4:
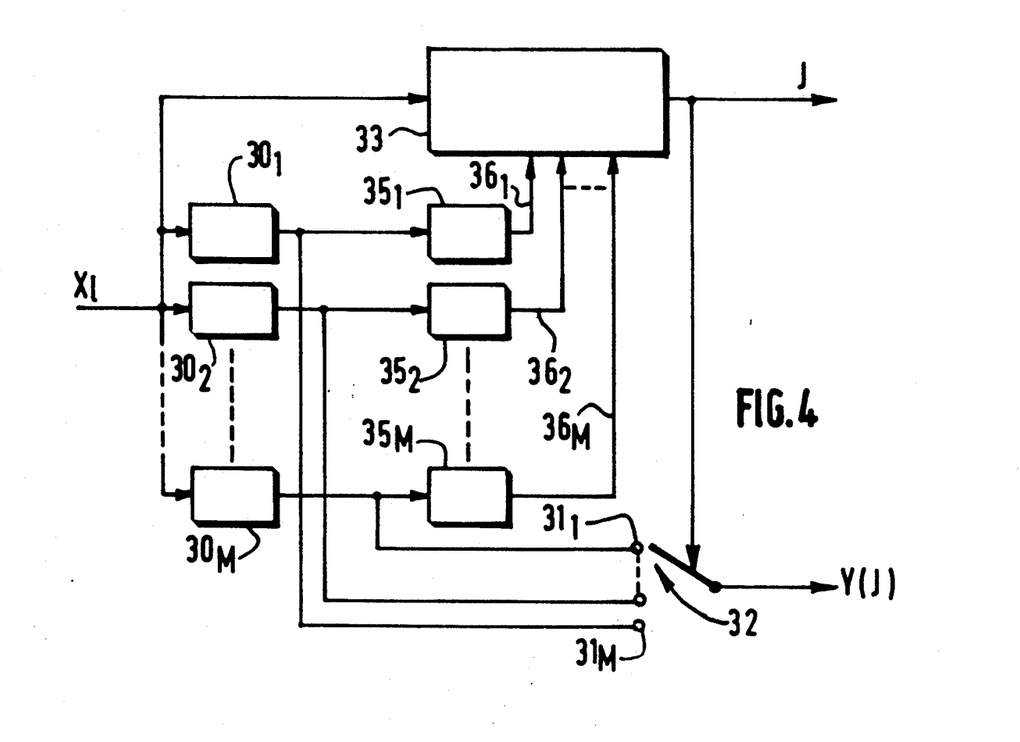
FIGS. 4, 5A: are two circuit diagrams of an encoder according to the invention provided with an a posteriori selection circuit.

According to a third embodiment of the encoder shown in FIG. 4, this embodiment also operates in the a posteriori mode. In this case each coding neural network $30_1 \ldots 30_M$ is followed by a decoding neural network $35_1 \ldots 35_M$. The selection circuit 33 then receives the outputs $36_1 \ldots 36_M$ of these decoding neural networks and compares each of these outputs with the input data $X_1$. The selection circuit then determines the neural network which effects the best encoding and supplies its index J which activates the selector 32.

Thus, the invention relates to a coding circuit for the compression of data comprising M coding neural networks, wherein M>1 which learn and thereafter effect the same type of transform and which are put in competition, each coding network having a number of input neurons greater than or equal to the number of output neuron, a selection circuit selecting on the basis of a selection criterion the coding neural network which effects the best coding and transmitting the index and the encoded data of this selected neural network.

Figure 6A:
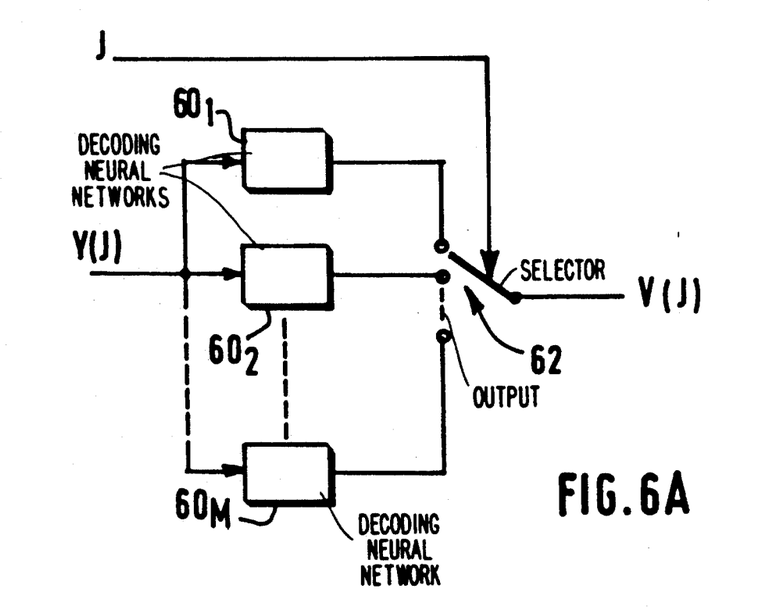
FIGS. 6A, 6B: are two circuit diagrams of an encoder according to the invention, one of which includes a memory for storing the set of synaptic coefficients.

The encoded data and the index J supplied in accordance with one of these three embodiments are transmitted to a decoder through a transmission channel. This decoder is shown in FIG. 6A. It is formed by M decoding neural networks $60_1 \ldots 60_M$ and a selector 62 which is activated by the index J received. Thus, the selector 62 is in connection with the output of the neural network whose index J has been transmitted thereto and which realises the best coding of the input data. These decoding neural networks are not submitted to a learning procedure but their memories are loaded at the start of the processing operation with the appropriate synaptic coefficients for effecting the transform which is the inverse of the transform effected during the coding operation. Each decoding neural network is matched with a coding neural network and its synaptic coefficients are determined during the joint learning phase for the coding and decoding networks. Thus, the invention relates to a decoding circuit for the decompression of data, comprising M decoding neural networks wherein M>1, which effects the same type of transform, each neural network having a number of input neurons less than or equal to the number of output neurons, an index being assigned to each neural network which index allows it to receive and decode only the encoded data associated with this index.

Figure 5B:
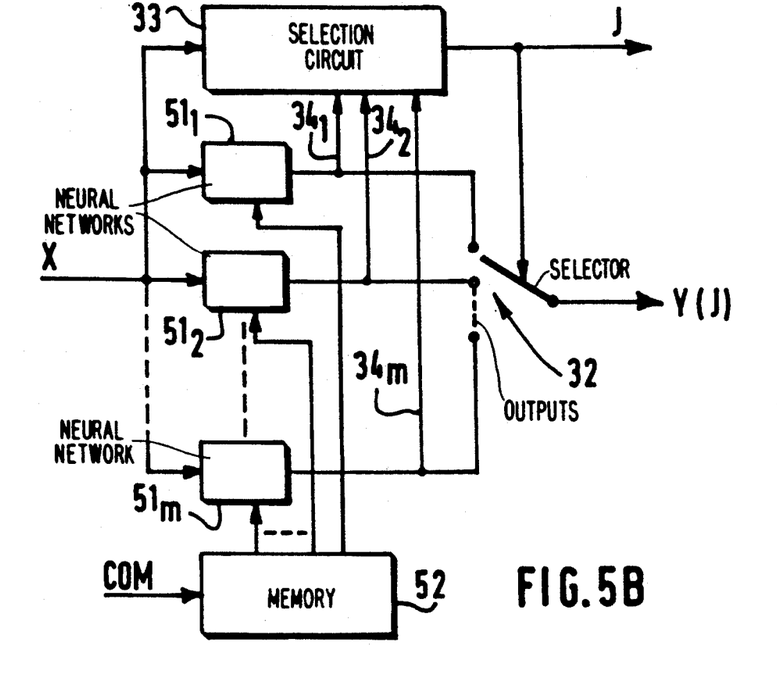
FIG. 5B: is a circuit diagram similar to that as shown in FIG. 5A but having a memory for storing the totality of the synaptic coefficients.

With the object of reducing the quantity of material required for putting M neural networks in competition, it may be advantageous to use a number of neural networks less than M. This is shown in FIG. 5B for the case of the encoder shown in FIG. 5A, but this is not limitative. Actually, it is sufficient to use m neural networks $51_1 \ldots 51_m$ wherein m<M and to load in these m neural networks their synaptic coefficients obtained from a memory 52 which contains the total quantity of synaptic coefficients to be used. Reading this memory is performed in response to a control signal COM which may be activated either cyclically in accordance with a given number of images or in accordance with a different criterion. At a given instant only the neural networks likely to be used at this instant are used.

In this case the coding circuit is characterized in that a coding neural network, or a group of coding neural networks, respectively, receives its synaptic coefficients under the control of an index or a control signal, respectively, coming from a memory which stores the synaptic coefficients which are suitable for encoding several classes of data examples.

Figure 6B:
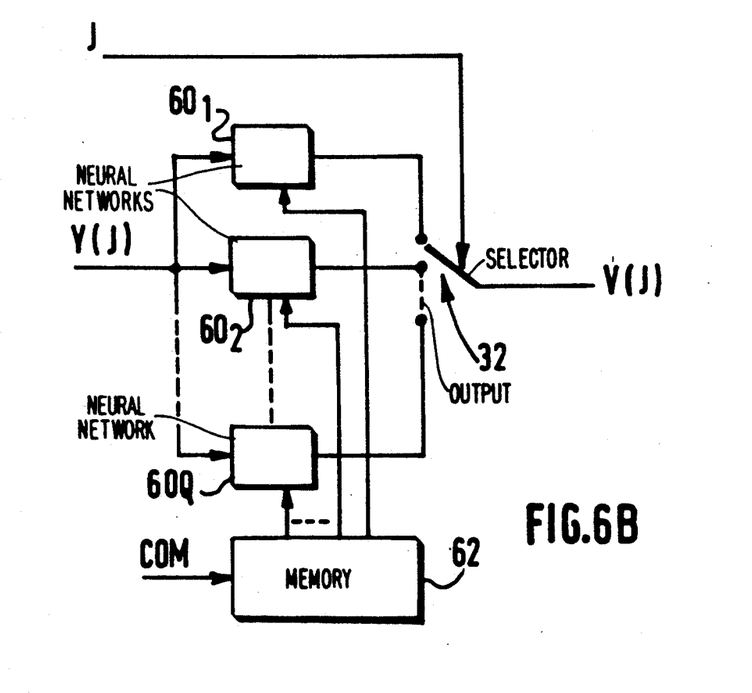

The decoder shown in FIG. 6B has a similar structure. It includes a memory 62 which stores all the synaptic coefficients and only loads the neural network $60_1 \ldots 60_m$ with the synaptic coefficients which are useful at this given instant. The control signal COM can be transmitted by the encoder or can be generated by the decoder depending on the criterion selected.

Thus, the invention relates to a decoder circuit which is characterized, in that a decoding neural network or a group of decoding neural networks, respectively, receives it synaptic coefficients under the control of the index received, or a control signal, respectively, from a memory which stores the synaptic coefficients which are suitable for decoding several classes of examples of data blocks.

In accordance with the mode of operation described it is found that one single coding neural network and one single decoding neural network operate simultaneously at a given instant. From this it follows that these two neural networks must effect the totality of the coding and decoding during a given processing cycle. Depending on the processing range it may be desirable for the processing cycle to be of a very short duration. This may cause some difficulties as regards the operating speed.

For that purpose, advantageous use is made of the fact that the other neural networks are inoperative in accordance with the mode of operation described so far for the distribution of the calculating load over all the neural networks. Thus, from being inoperative these neural networks become operative.

An encoder and a decoder are thus grouped within a data compression structure via a transmission channel. Such a structure may include means for selecting the data coming from the decoding neural network which process the same examples so as to provide the textures of the data blocks.

The idea is to provide that instead of having P results calculated by one neural network, one result is calculated by P neural networks.

Figure 7A:
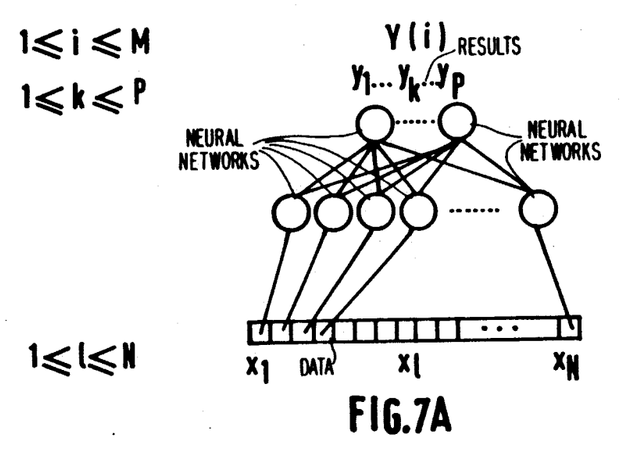
FIGS. 7A, 7B, 8A, 8B: are schematic representations of two possibilities to spread calculations over the coding neural networks.
Figure 7B:
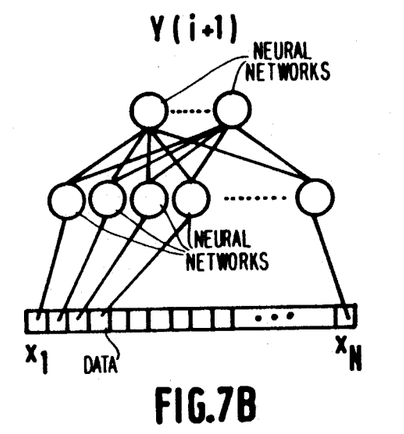

This is shown in FIGS. 7A, 7B, 8A, 8B. In accordance with the first method a network having index i wherein $1 \leq i \leq M$ (FIG. 7A) receives the data $x_1$ to $x_N$ and determines the result $y_k(i)$ denoted $y_k$ for each value of i wherein $1 \leq k \leq P$. The networks having the index $i+1$ performs a similar calculation for $y_k (i+1)$ (FIG. 7B).

It is possible to load synaptic coefficients which perform the following processing, in P neural networks. The input data $x_1 \ldots x_N$ are inputted in the neural networks and determine the results $Z_i(k)$, denoted $Z_k$ for each value of i (FIG. 8A).

The subsequent neural network performs a similar calculation for $Z_i(k+1)$.

Figure 8A:
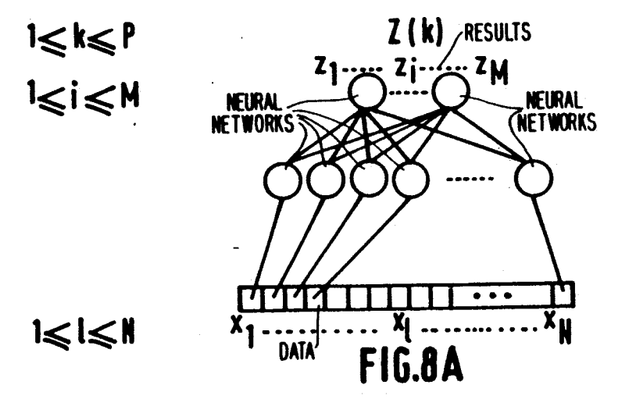
Figure 8B:
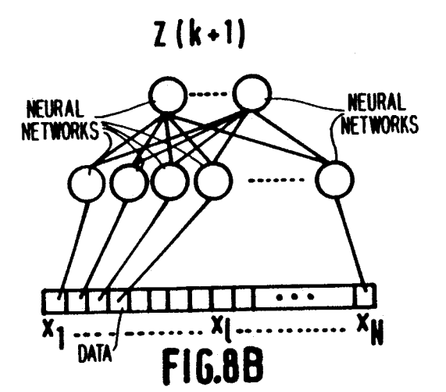

The division into M and P neural networks is shown in FIGS. 8A and 8B, respectively, for the encoder. It will be obvious that the same division exists at the level of the decoder.

Thus, having permuted the indices i and k it is possible to utilise P neural networks which each determine M results instead of utilising M neural networks which each determine P results. The calculating load is thus distributed over all the hardware and a faster processing can be effected.

All the P results, whether they are transmitted by one or by a plurality of neural networks are directly linked to a predetermined type of examples. In the case of an image, an example will be representative of a texture of the image. At the end of the process operation effected on a certain number of data blocks, the data decoded by the neural networks relating to the same example may be regrouped to form a structure of the block to be processed.

It is sometimes possible to limit the number of encoders/decoders used. Actually, after the learning phase, neural networks can put identical results in operation. These results may form into families for which the deviations are very close. It is then sufficient to choose in each family one of the neural networks representing this family. Thus a system is obtained for which the decoded data are formed by a much smaller number of neural networks, that is to say one for each family.

We claim:

1. A data compression method which is put into effect with the aid of an encoder for transforming input data with the aid of a coding neural network provided at a transmission end of a channel, said coding neural network having a number (N) of input neurons greater than or equal to the number (P) of output neurons, and a decoder which comprises a decoding neural network which is matched to the coding neural network positioned at a receiving end of said channel for effecting the inverse transform of the encoder with a number (P) of input neurons less than or equal to the number (N) of output neurons, the method comprising the following steps:

learning by the coding and decoding neural networks, by adapting their synaptic coefficients to examples of blocks of input data, encoding data blocks to be processed at the transmission end, transmitting encoded data via said channel, decoding of the encoded data received by the matched decoding neural network at the receiving end and formation of the recovered data blocks, characterized in that there is an arrangement of M coding neural networks, in competition, with each other, each identified by an index, wherein M>1, provided at the transmission end each of which effect the same type of transform and the encoded data of one or more of which are transmitted, after selection, toward paired decoding neural networks which form part of a set of several matched decoding neural networks positioned at the receiving end, each coding and decoding neural network being adapted as a result of learning to a specific class of predetermined examples of data blocks and matched with the aid of a predetermined adaptation criterion, selecting on the basis of a selection criterion, the one or more coding neural networks which effect the best coding of the data to be processed and, transmitting over the channel the data encoded by said one or more coding neural networks and their indices to render the matched decoding neural networks active.

2. A method as claimed in claim 1, characterized in that the encoded data of a block for all (P) outputs of the arrangement of M coding neural networks is supplied by one single neural network.

3. A method as claimed in claim 1, characterized in that the encoded data of a block for the (P) output of the arrangement of M coding neural networks is supplied one by one by P of the M coding neural networks.

4. A method as claimed in claim 1, characterized in that said selecting is by comparing at least one characteristic of each data block to be processed to a predetermined corresponding characteristic and selecting the coding neural network and the matched decoding neural network relating to the nearest approximative characteristic.

5. A method as claimed in claim 4, characterized in that the characteristics which are taken into account in said comparing are constituted by the minimal value and the maximum value of the data of the example and of the data block to be processed.

6. A method as claimed in claim 1, characterized in that the encoder comprises several couples of neural networks, a couple being constituted by a coding neural network and a matched decoding neural network, the selection circuit comparing during the coding step and for each couple, the input data of the coding neural network to the output data of its decoding neural network, the selection criterion of the best coding consisting in the selection of the coding neural network for which this deviation between output data and input data is minimal.

7. A method as claimed in claim 1 characterized in that the selection circuit determines the sum of all the energies of the output neurons of the coding neural networks and selects that output neuron for which this energy is at its maximum.

8. A method as claimed in claim 1 characterized in that the predetermined adaptation criterion of the learning phase is the gradient back propagation algorithm.

9. A method as claimed in claim 1 characterized in that the predetermined adaptation criterion of the learning phase is the principal component analysis algorithm of the covariance matrix.

10. A method as claimed in claim 1 characterized in that to effect the learning operation, each encoder is associated with an appendent decoder and with appropriate synaptic coefficients adaptation means, the synaptic coefficients of the appendant decoder being transmitted to the decoder to effect the decompression of the data.

11. A method as claimed in claim 1, characterized in that the method puts the learning into effect in appendant coding/decoding means whose synaptic coefficients are transferred to the encoder and to the decoder, respectively, which effects the compression/decompression of the data.

12. A method as claimed in claim 1, characterized in that the image is divided into sub-images which furnish the examples of data blocks to be processed.

13. A method as claimed in claim 1, characterized in that the examples of the data blocks to be processed are included in a texture catalogue.

14. A coding circuit for the compression of data, comprising M coding neural networks wherein $M > 1$ which learn and thereafter effect the same type of transform and which are put in competition, each network having a number of input neurons greater than or equal to the number of output neurons, a selection circuit comprising means for selecting on the basis of a selection criterion, that coding neural network that effects the best encoding and transmitting the index and the encoded data of this selected neural network.

15. A coding circuit as claimed in claim 14, characterized in that one or a group of said M coding neural networks, respectively, receives its synaptic coefficients under the control of a different index or a control signal, supplied by a memory which stores the synaptic coefficients which are appropriate for encoding several classes of data examples.

16. A decoding circuit for the decompression of data comprising M decoding neural networks wherein $M > 1$, which effect the same type of transform, each neural network having a number of input neurons less than the number of output neurons, there being assigned to each neural network an index which allows it to receive and decode only the encoded data associated with this index.

17. A decoding circuit as claimed in claim 16, characterized in that a decoding neural network or a group of decoding neural networks, respectively, receives its synaptic coefficients under the control of the index received or a control signal, respectively, from a memory which stores the synaptic coefficients which are appropriate for decoding several classes of examples of data blocks.

18. A data compression system comprising:
 a coding means comprising an arrangement of M coding neural networks in competition, each having N input neurons for receiving input data and P output neurons for coded data, said N input neurons being greater than or equal in number to said P output neurons, and a selection circuit means for selecting on the basis of a selection criterion, one or more of said M coding neural networks that effect the best coding of the input data;
 means for transmitting in a channel the data coded by the selected coding neural networks along with indices identifying the selected coding neural networks; and
 a decoding means at a receiving end of said channel comprising one or more decoding neural networks, matched to the indices received, each having P input neurons and N output neurons, for receiving and decoding the transmitted data.

19. A system as claimed in claim 18, characterized in that the number of selected coding neural networks is equal to a number of families in which the coding neural networks are grouped and which have a similar behaviour determined by a similar criterion.

* * * * *